US010126550B2

(12) United States Patent
Teramoto et al.

(10) Patent No.: US 10,126,550 B2
(45) Date of Patent: Nov. 13, 2018

(54) OPTICAL ELEMENT, LIGHT-SHIELDING PAINT SET, AND METHOD FOR MANUFACTURING OPTICAL ELEMENT

(71) Applicant: CANON KABUSHIKI KAISHA, Tokyo (JP)

(72) Inventors: Yoji Teramoto, Yokohama (JP); Shuhei Yamamoto, Tokyo (JP); Reiko Kubota, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/015,639

(22) Filed: Feb. 4, 2016

(65) Prior Publication Data

US 2016/0231563 A1 Aug. 11, 2016

(30) Foreign Application Priority Data

Feb. 5, 2015 (JP) ................. 2015-021500

(51) Int. Cl.
| | |
|---|---|
| C09D 5/00 | (2006.01) |
| G02B 27/00 | (2006.01) |
| G02B 1/111 | (2015.01) |
| G02B 5/00 | (2006.01) |
| C09D 163/00 | (2006.01) |
| C09D 7/40 | (2018.01) |
| C08K 3/36 | (2006.01) |
| C08K 3/013 | (2018.01) |

(52) U.S. Cl.
CPC ......... *G02B 27/0018* (2013.01); *C09D 5/006* (2013.01); *C09D 7/67* (2018.01); *C09D 7/68* (2018.01); *C09D 163/00* (2013.01); *G02B 1/111* (2013.01); *G02B 5/003* (2013.01); *C08K 3/013* (2018.01); *C08K 3/36* (2013.01)

(58) Field of Classification Search
CPC .... C09D 5/006; C09D 7/1266; C09D 7/1275; G02B 1/111; G02B 5/003; G02B 27/0018
USPC ....................................................... 523/220
See application file for complete search history.

(56) References Cited

U.S. PATENT DOCUMENTS

2008/0297980 A1 12/2008 Bourcier et al.
2014/0323612 A1 10/2014 Kubota

FOREIGN PATENT DOCUMENTS

| CN | 101460306 A | 6/2009 |
|---|---|---|
| CN | 102770497 A | 11/2012 |
| JP | 2011-186437 A | 9/2011 |
| JP | 2011-186438 A | 9/2011 |
| JP | 2012155180 A | 8/2012 |
| KR | 10-2009-0092796 A | 9/2009 |

OTHER PUBLICATIONS

"Epoxy—Wikipedia, the free encyclopedia", Aug. 26, 2015, XP055252543, Retrieved from the Internet:URL:https://en.wikipedia.org/w/index.php?title=Epoxy&0Idid=678000313, 11 pages, [retrieved on Feb. 23, 2016].

*Primary Examiner* — Edward J Cain
(74) *Attorney, Agent, or Firm* — Canon U.S.A., Inc. IP Division

(57) ABSTRACT

An optical element includes a substrate and a light-shielding film on a part of the periphery of the substrate. The light-shielding film contains a compound having an epoxy group, a coloring agent, inorganic particles having a refractive index of 2.2 or more, and silica particles. The average concentration of the inorganic particles in an interface region having a thickness of 15 nm from the interface between the substrate and the light-shielding film is 1.1 to 1.5 times as high as the average concentration of the inorganic particles in the light-shielding film.

38 Claims, 2 Drawing Sheets

OPTICAL ELEMENT, LIGHT-SHIELDING PAINT SET, AND METHOD FOR MANUFACTURING OPTICAL ELEMENT

BACKGROUND OF THE INVENTION

Field of the Invention

The present disclosure relates to a light-shielding paint, a light-shielding paint set, an optical element that are used for optical apparatuses, such as cameras, binoculars, and microscopes, and to a method for manufacturing the optical element.

Description of the Related Art

A light-shielding film used in an optical element is a coating film formed on, typically, a surface of a glass member. Although the optical element may be a lens, a prism or any other optical glass, a light-shielding film of a lens will be described below by way of example.

As shown in FIG. 4, a light-shielding film 1 of an optical element is formed on a periphery of a lens 2. If light impinges only on the lens 2 as incident light 3 does, the light passes through the lens as transmission light 4. On the other hand, if light obliquely enters the lens 2 as incident light 5 does, the light impinges on the light-shielding film 1. At this time, if the light-shielding film is not formed (like the lower side of the lens shown in FIG. 4), light 5 incident on the periphery of the lens 2 reflects internally and goes out of the lens 2 as internally reflected light 6 that is not involved in forming an image. This light causes flaring or ghosts, thus degrading image quality. A light-shielding film 1 formed as on the upper side of the lens shown in FIG. 4 can reduce the internal reflection of obliquely incident light 5. Accordingly, internally reflected light 6 adversely affecting the image is reduced, and flaring and ghosts are prevented.

As optical apparatuses are being downsized and required to have higher performance, materials having higher refractive indices are coming to be used for the optical elements of optical systems. For example, glass materials having a refractive index of 1.80 or more or more than 2.00 are used.

In order to reduce internal reflection of light in an optical element having a high refractive index, the refractive index of the light-shielding film is increased. Japanese Patent Laid-Open No. 2011-186437 discloses a method for controlling the refractive index of a light-shielding film by adding a material having a high refractive index to the light-shielding film.

This patent document also discloses a light-shielding film for an optical element. This light-shielding film contains inorganic non-black particles for increasing refractive index and a dye for absorbing light, so that internal reflection is reduced.

Unfortunately, the light-shielding film of this patent document has a uniform composition. If this light-shielding film is formed on a glass member, the refractive index of the entire light-shielding film must be close to the refractive index of the glass member in order to reduce internal reflection. For forming a light-shielding film on a glass member having a high refractive index, a large amount of inorganic particles having a high refractive index is added to the light-shielding film. If a large amount of inorganic particles is added to the light-shielding film, the inorganic particles form an aggregate that is likely to scatter light, thus degrading optical properties of the light-shielding film. In addition, since the resin content is relatively reduced, weather resistance can be reduced.

SUMMARY OF THE INVENTION

Accordingly, the present disclosure provides an optical element that can exhibit good optical properties, in which internal reflection and scattering are prevented even though it is such that a light-shielding film is formed on a high-refractive-index substrate.

According to an aspect of the disclosure, an optical element is provided which includes a substrate and a light-shielding film on a part of the periphery of the substrate. The light-shielding film contains a compound having an epoxy group, a coloring agent, inorganic particles having a refractive index of 2.2 or more, and silica particles. The average concentration of the inorganic particles in an interface region having a thickness of 15 nm from the interface between the substrate and the light-shielding film is 1.1 to 1.5 times as high as the average concentration of the inorganic particles in the light-shielding film.

According to another aspect of the disclosure, a light-shielding paint set is provided. The light-shielding paint set includes a first unit containing inorganic particles having a refractive index of 2.2 or more, a second unit containing silica particles, and a third unit containing an amine-based curing agent, and any of the first, the second and the third unit contains a compound having an epoxy group. The inorganic particles have a number average particle size $d_p$ in the range of 10 nm to 100 nm, the silica particles have a number average particle size $d_{si}$ in the range of 50 nm to 350 nm, and the inorganic particles and the silica particles satisfy the following relationship: 40 nm$\leq(d_{si}-d_p)\leq$330 nm.

Also, a method is provided for manufacturing an optical element including a substrate and a light-shielding film on a part of the periphery of the substrate. The method includes applying a light-shielding paint onto the periphery of the substrate to form a coating, and curing the coating to form the light-shielding film. The light-shielding paint is prepared by mixing the above-described first, second and third units.

Further features of the present disclosure will become apparent from the following description of exemplary embodiments with reference to the attached drawings.

DESCRIPTION OF THE EMBODIMENTS

Preferred embodiments of the present disclosure will now be described.

The light-shielding film used in an optical element according to an embodiment of the present disclosure has a function to sufficiently reduce internal reflection even though it is formed on a glass member having a high refractive index.

Figure 1:
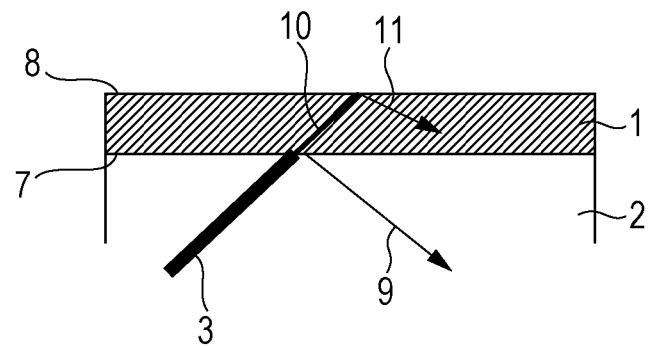
FIG. 1 is a schematic representation of the traveling direction of internally reflected light.

Internal reflection in an optical element will first be described. Secondary, the structure of the light-shielding film used in an embodiment of the present disclosure will be described. Then, there will be described a light-shielding paint, a light-shielding paint set and a light-shielding film that can achieve an optical element having the above function, and methods for manufacturing the light-shielding film and the optical element. Internal reflection in Optical Element The principle of internal reflection in an optical element will first be described with reference to FIG. 1. Internal reflection occurs mainly at two interfaces 7 and 8. More specifically, incident light 3 enters a substrate (lens) 2, travels through the substrate 2 and reflects at the interface 7 between the substrate 2 and the light-shielding film 1, thus being transformed into first reflected light 9. Also, light 10 passing through the light-shielding film 1 reflects at the interface 8 between the light-shielding film 1 and air, thus being transformed into second reflected light 11.

The first reflected light 9 can be reduced by bringing the refractive index of the light-shielding film 1 close to the refractive index of the substrate (lens) 2. The reason why internal reflection is reduced by bringing the refractive indices close to each other is that the reflectance R of the interface 7 between the light-shielding film 1 and the lens 2 depends on the difference between the refractive index $n_0$ of the side of the lens 2 on which light 3 is incident and the refractive index $n_1$ of the light-shielding film 1, and that the smaller the difference in refractive index, the lower the reflectance R, as suggested in the following equation (2):

$$R = \frac{(n_1 - n_0)^2}{(n_1 + n_0)^2} \quad (2)$$

The second reflected light 11 can be reduced by absorbing the light 10 passing through the light-shielding film 1. For efficiently absorbing the light 10 passing through the light-shielding film 1, it is advantageous to add a coloring agent to the light-shielding film 1 to increase the degree of blackness of the film.

Characteristic Features of Light-Shielding Film

Figure 2:
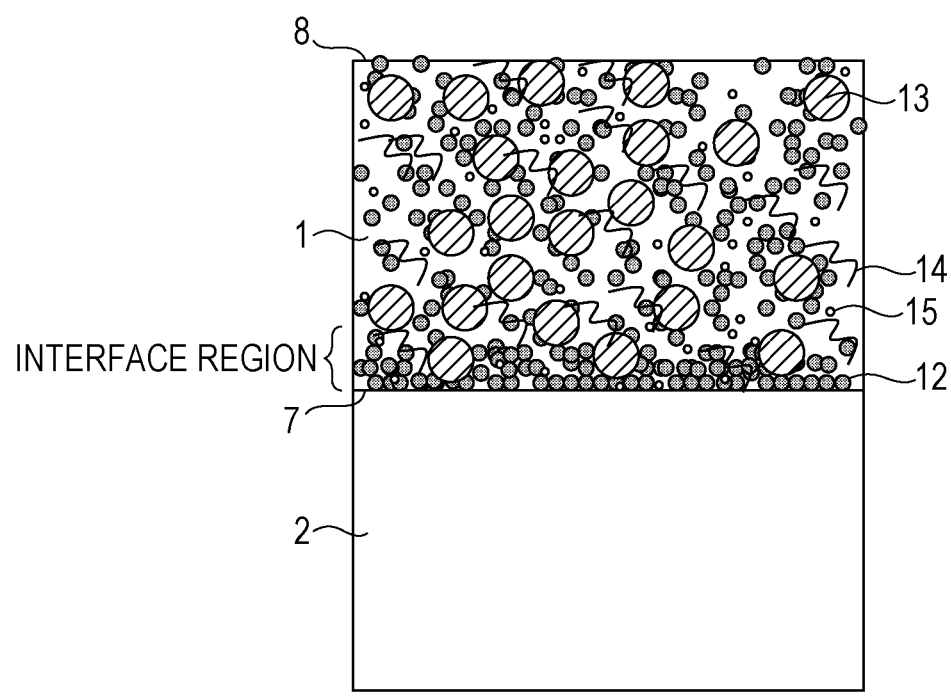
FIG. 2 is a schematic representation of a light-shielding film of an optical element according to an embodiment of the disclosure.

In the light-shielding film 1 of the optical element of the present disclosure, the concentration of inorganic particles 12 having a refractive index (nd) of 2.2 or more in the vicinity of the interface 7 between the light-shielding film 1 and the substrate 2 is increased to be higher than that of the entire light-shielding film, as shown in FIG. 2. Consequently, the difference in refractive index between the light-shielding film 1 and the substrate 2 is reduced at the interface 7 therebetween.

It will now be described how to unevenly distribute inorganic particles 12 having a refractive index (nd) of 2.2 or more so as to be dense in the vicinity of the interface between a glass member and a light-shielding film.

The light-shielding film 1 according to the present disclosure is formed by curing a mixture of inorganic particles 12 having a refractive index (nd) of 2.2 or more, silica particles 13, a compound 14 having an epoxy group, an amine-based curing agent, and a coloring agent 15.

In order to unevenly distribute the inorganic particles 12 so as to be dense at the interface 7 between the substrate 2 and the light-shielding film 1, the inorganic particles 12 in the light-shielding paint applied onto the substrate 2 are selectively moved toward the interface region adjacent to the interface between the substrate 2 and the light-shielding film 1. As the light-shielding paint is applied, the solvent in the light-shielding paint evaporates, and thus the light-shielding paint starts drying from the surface thereof. As the paint is drying, the coating film thereof shrinks in the thickness direction. At this time, the inorganic particles 12 and silica particles 13 in the paint start to settle. It is thought that, in particular, when the particle size of the silica particles 13 is larger than that of the inorganic particles 12, the inorganic particles pass among the silica particles that have settled down. In order to raise this phenomenon, the particle sizes of the inorganic particles 12 and the silica particles 13 in the light-shielding paint and the relationship between the particle sizes are controlled. Also, it is desirable to control the heteroaggregation of the inorganic particles 12 and silica particles 13 in the light-shielding film 1 and to control the viscosity of the light-shielding paint. In addition, it is desirable to determine the composition of the light-shielding paint in view of coating property and drying property of the pain and the weather resistance of the resulting light-shielding film.

Light-Shielding Paint

The material constitution of the light-shielding paint used for manufacturing the optical element of the present disclosure will now be described. In the description, hereinafter, the content of each constituent in the light-shielding paint is that relative to the total amount of the light-shielding paint containing a curing agent unless otherwise specified.

The light-shielding paint according to the present disclosure contains inorganic particles 12 having a refractive index (nd) of 2.2 or more, silica particles 13, a compound 14 having an epoxy group, a coloring agent 15, and an amine-based curing agent.

The viscosity of the light-shielding paint is desirably in the range of 20.0 mPa·s to 65 mPa·s, such as in the range of 30.0 mPa·s to 50 mPa·s. If the viscosity of the light-shielding paint is less than 20 mPa·s, the paint is likely to move during drying, thus inferior in coating property. In contrast, if the viscosity is increased beyond 65 mPa·s, the diffusion of the inorganic particles 12 toward the interface between the glass substrate and the light-shielding film is suppressed, and consequently, internal reflection is reduced.

Next, the constituents in the light-shielding paint of the present disclosure will be described.

Compound Having Epoxy Group

The compound 14 having an epoxy group in the light-shielding paint may be an epoxy resin or a resin treated with an epoxy-based coupling agent.

Examples of the epoxy resin that can be used in the light-shielding paint include bisphenol A-type epoxy resins, bisphenol F-type epoxy resins, polyfunctional epoxy resins, flexible epoxy resins, brominated epoxy resins, glycidyl ester-type epoxy resins, high-molecular-weight epoxy resins, and bipheny-type epoxy resins. Epoxy resins may be used singly or in combination.

The epoxy resin content in the light-shielding paint is desirably in the range of 5.0% by mass to 25.0% by mass. If the epoxy resin content is less than 5.0% by mass, the resistance to solvent of the light-shielding paint is inferior due to the low resin content in the light-shielding paint. In contrast, if the epoxy resin content is increased beyond 25.0% by mass, the refractive index decreases, and accordingly internal reflection increases.

The epoxy-based coupling agent content in the light-shielding paint is desirably in the range of 0.5% by mass to 15.0% by mass. If the epoxy-based coupling agent content is less than 0.5% by mass, the adhesion of the resulting light-shielding film to the substrate decreases. Also, if the epoxy-based coupling agent content is increased beyond 15.0% by mass, the adhesion of the resulting light-shielding film to the substrate decreases. A commercially available silane coupling agent having an epoxy group or a synthesized silane coupling agent having an epoxy group may be used as the epoxy-based coupling agent. Examples of the silane coupling agent include 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriepoxysilane.

Inorganic Particles of 2.2 or more in Refractive Index

In the present disclosure, inorganic particles having a refractive index (nd) of 2.2 or more are used as the inorganic particles in the light-shielding paint. Advantageously, the refractive index (nd) of the inorganic particles is in the range of 2.2 to 3.5. If the refractive index (nd) of the inorganic particles is less than 2.2, the refractive index of the resulting light-shielding film is not much increased. Consequently, the difference in refractive index between the substrate and the light-shielding film increases, and internal reflection increases.

The inorganic particles having a refractive index (nd) of 2.2 or more desirably have average particles size ($d_p$) in the range of 10 nm to 100 nm, such as in the range of 10 nm to 90 nm. The inorganic particles comprises a single compound or a plurality of compounds. A material made up of inorganic particles having an average particle size ($d_p$) of less than 10 nm has a significantly large surface area. The viscosity of the paint is therefore increased and the paint gelates easily. If the inorganic particles have an average particle size ($d_p$) of more than 100 nm, on the other hand, each of the inorganic particles acts as a light scattering source and easily causes the light-shielding film to scatter light. Also, the inorganic particles do not move as intended after the paint is applied. Accordingly, the inorganic particles are unlikely to be unevenly distributed so as to be dense at the interface 7 between the substrate 2 and the light-shielding film 1.

The inorganic particles used in the light-shielding paint may be in any shape, such as completely spherical, substantially spherical, oval, rectangular solid, cubic, a combined shape thereof, or irregular shapes, without particular limitation. In the description in the present disclosure, the particle size of the inorganic particles refers to the number average particle size of the primary inorganic particles. Since the light-shielding film disclosed herein contains inorganic particles having a refractive index (nd) of 2.2 or more, the light-shielding film can have a high refractive index and accordingly have the function of reducing internal reflection.

Exemplary inorganic particles having a refractive index (nd) of 2.2 or more include titania particles, zirconia particles, cadmium oxide particles, diamond particles, and strontium titanate particles.

The content of the inorganic particles in the light-shielding paint is desirably in the range of 2.5% by mass to 17.5% by mass, such as in the range of 5.0% by mass to 15.0% by mass. If the inorganic particle content is lower than 2.5% by mass, the refractive index of the light-shielding film decreases, and, in contrast, if it is higher than 17.5% by mass, the weather resistance of the light-shielding film is inferior.

Titania particles are inexpensive and have high refractive index and are therefore suitable as the inorganic particles used therein having a refractive index (nd) of 2.2 or more.

Since titania particles have a high refractive index, the refractive index of the light-shielding film can be increased by adding titania particles having a high refractive index to the light-shielding film.

Preferably, the average particle size ($d_p$) of the inorganic particles 12 is in the range of 10 nm to 100 nm, such as in the range of 10 nm to 90 nm. If the average particle size ($d_p$) of the inorganic particles 12 is smaller than 10 nm, the viscosity of the paint increases because the surface area of the particles increases tremendously. Accordingly, the inorganic particles 12 become likely to aggregate very easily, accordingly difficult to disperse. If the average particle size ($d_p$) of the inorganic particles 12 is larger than 100 nm, the inorganic particles each act as a light scattering source. Consequently, the light-shielding film is unlikely to function satisfactorily as expected. Also, the particles in the coating of the light-shielding paint are hindered from moving, and thus the inorganic particles 12 cannot be easily distributed to the vicinity of the interface 7 between the substrate 2 and the light-shielding film 1. The particle size of the inorganic particles 12 used herein is the number average particle size of the primary inorganic particles.

The inorganic particles 12 having a refractive index (nd) of 2.2 or more may be produced by any known process, such as a gas phase process or a liquid phase process, as long as the refractive index and average primary particle size thereof satisfy desired conditions. For example, titanium dioxide particles may be synthesized by introducing titanium metal powder to a flame in an atmosphere containing at least oxygen, or a sol-gel process in which titanium alkoxide may be hydrolyzed and polycondensed in the presence of a catalyst. It is known that titania has a crystal structure, such as a rutile structure or an anatase structure, and has a higher refractive index than materials having an amorphous structure. Any crystalline titania may be used as long as it has a desired refractive index.

Although the surfaces of the inorganic particles 12 may be hydrophilic or hydrophobic, hydrophobic inorganic particles 12 are easy to distribute to the vicinity of the interface and are therefore suitable.

Silica Particles

Desirably, the number average particle size ($d_{si}$) of the silica particles 13 is in the range of 50 nm to 350 nm, such as in the range of 150 nm to 300 nm. If the average particle size of the silica particles 13 is smaller than 50 nm, the light-shielding paint has low thixotropy, and the coating property of the light-shielding paint decreases. Also, the silica particles 13 is likely to move while the light-shielding paint is applied. The silica particles 13 that have moved to the interface 7 between the substrate 2 and the light-shielding film 1 hinder the inorganic particles 12 from moving, consequently increasing internal reflection. If the number average particle size ($d_{si}$) of the silica particles 13 is larger than 350 nm, the silica particles 13 each act as a source of light scattering. Consequently, the light-shielding film is unlikely to function satisfactorily as expected. If the silica particles 13 have aggregated to form secondary particles, the particle size of silica particles refers to that of secondary silica particles. Silica particles having a branched-chain structure, in which spherical silica particles 13 are connected to each other, form large spaces thereamong when the light-shielding paint is applied, and thus help the inorganic particles 12 move.

The silica particle content in the light-shielding paint is desirably in the range of 2.5% by mass to 15.0% by mass, such as in the range of 2.5% by mass to 10.0% by mass. If the silica particle content is lower than 2.5% by mass, the light-shielding paint has low thixotropy, and the coating property of the light-shielding paint decreases. In contrast, if the silica particle content is higher than 15.0% by mass, the weather resistance of the light-shielding film is inferior.

By adding silica particles 13 to the light-shielding paint, the coating property of the pain can be improved. In addition, the difference in linear expansion between the resulting light-shielding film 2 and the substrate 1 can be reduced, and thus cracks caused by heat shock can be prevented.

The surfaces of the silica particles 13 may be hydrophilic or hydrophobic.

Relationship Between Inorganic Particles and Silica Particles

By controlling the average particle sizes of the inorganic particles 12 having a refractive index (nd) of 2.2 or more and the silica particles 13, the inorganic particles 12 can be selectively moved to the vicinity of the interface between the substrate and the light-shielding film while the light-shielding pain is applied. In the light-shielding paint of the present disclosure, the average particle size ($d_p$) of the inorganic particles 12 and the average particle size ($d_{si}$) of the silica particles 13 satisfy the following relationship (1):

$$40\ \text{nm} \le (d_{si} - d_p) \le 330\ \text{nm} \tag{1}$$

When ($d_{si}-d_p$) is less than 40 nm, the spaces formed by the silica particles 13 in the light-shielding paint being applied is reduced, and the inorganic particles 12 cannot easily pass through the spaces. Consequently, the inorganic particles 12 cannot selectively come close to the interface between the glass substrate and the light-shielding film. When ($d_{si}-d_p$) is larger than 330 nm, the inorganic particles 12 and the silica particles 13 are likely to cause heteroaggregation. Consequently, the heteroaggregation hinders the inorganic particles 12 from selectively moving toward the interface 7 between the substrate 2 and the light-shielding film 3.

In the optical element produced using the light-shielding paint according to an embodiment of the present disclosure, the average concentration of the inorganic particles 12 in the interface region having a thickness of 15 nm from the interface 7 between the substrate 2 and the light-shielding film 1 is 1.1 to 1.5 times as high as the average concentration of the inorganic particles 12 in the light-shielding film 1.

Coloring Agent

The coloring agent 15 used in the light-shielding paint according to the present disclosure may be a dye, a pigment or a mixture thereof. The dye absorbs visible light in a wavelength region of 400 nm to 700 nm and is soluble in a solvent. The dye may be composed of a single constituent or may be a mixture of a plurality of dyes of black, red, yellow and blue. If a pigment is used, the pigment is selected from among the pigments that can absorb visible light in a wavelength region of 400 nm to 700 nm. The pigment may be a carbon black, a titanium black, an iron oxide, or a copper-iron-manganese composite oxide. The number average particle size of the pigment is desirably in the range of 5 nm to 200 nm. If the average particle size of the pigment is smaller than 5 nm, the stability of the light-shielding paint decreases. In contrast, if the average particle size of the pigment is larger than 200 nm, internal reflection increases in an optical element provided with the light-shielding film.

The coloring agent 15 content in the light-shielding paint is desirably in the range of 2.5% by mass to 15.0% by mass, such as in the range of 5.0% by mass to 10.0% by mass.

Amine-Based Curing Agent

The light-shielding paint according to the present disclosure contains an amine-based curing agent to cure the epoxy resin contained therein. The amine-based curing agent can be selected from among linear aliphatic compounds, polyamides, alicyclic compounds, aromatic compounds, and other compounds such as dicyanodiamide and dihydrazide adipate. The amino group of an amine-based curing agent is active and can interact with active groups at the surfaces of the inorganic particles 12 or silica particles 13, thus causing the particles to aggregate. From the viewpoint of preventing such aggregation, the active amino group is desirably protected by the structure shown in formula (3). The structure shown in formula (3) is hydrolyzed into an active amino group in the presence of water. Since the amino group content in the light-shielding paint immediately after the preparation is therefore low, the aggregation of the inorganic particles 12 and the silica particles 13 is suppressed.

The amine-based curing agent may be composed of a single compound or may be a mixture of a plurality of amine-based curing agents.

The amine-based curing agent content in the light-shielding paint is desirably in the range of 0.5% by mass to 13.0% by mass. If the amine-based curing agent content is lower than 0.5% by mass, the hardness of the resulting light-shielding film decreases, and the adhesion of the light-shielding film to the substrate decreases. In contrast, if the amine-based curing agent content is higher than 13.0% by mass, satisfactory optical properties are not obtained.

Organic Solvent

Desirably, the light-shielding paint contains an organic solvent to control the viscosity thereof. The organic solvent used in the light-shielding paint is not particularly limited as long as it can satisfactorily disperse inorganic particles and satisfactorily dissolve the compound 14 having an epoxy group, the coloring agent 15 and an amine-based curing agent. Organic solvents that can be used include propylene glycol monomethyl ether, propylene glycol monobutyl ether, propylene glycol monomethyl ether acetate, methyl ethyl ketone, methyl isobutyl ketone, xylene, toluene, benzyl alcohol, isopropyl alcohol, acetone, and ethanol. These organic solvents may be used singly or in combination.

Curing Catalyst

In an embodiment, the light-shielding paint may further contain a curing catalyst. The use of a curing catalyst increases the crosslink density of the epoxy resin in the resulting light-shielding film, thereby enhancing the resistance to solvent. Tertiary amines and imidazole compounds are suitable as the curing catalyst. Exemplary tertiary amines include benzyldimethylamine, 2-(dimethylaminomethyl) phenol, 2,4,6-tris(diaminomethyl)phenol, and tri-2-ethylhexyl acid salts. Exemplary imidazole compounds include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, and 2,4-diamino-6-[2-methylimidazolyl-(1)]-ethyl-s-triazine.

The curing catalyst content in the light-shielding paint is desirably in the range of 0.5% by mass to 2.5% by mass. If the curing catalyst content is lower than 0.5% by mass, the resulting light-shielding film may have the insufficient resistance to solvent. In contrast, if the curing catalyst content is higher than 2.5% by mass, the crosslink density of the resulting light-shielding film 1 may be reduced, and consequently, the toughness of the film may be degraded.

Coupling Agent

From the viewpoint of improving the binding property between the resin and the inorganic and silica particles 12 and 13 in the resulting light-shielding film, the light-shielding paint of an embodiment may contain a coupling agent. Examples of the coupling agent include, but are not limited to, 3-glycidoxypropyltrimethoxysilane, 3-glycidoxypropylmethyldimethoxysilane, 3-glycidoxypropylmethyldiethoxysilane, 3-glycidoxypropyltriethoxysilane, 2-(3,4-epoxycyclohexyl)ethyltrimethoxysilane, vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, N-phenyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatepropyltriethoxysilane.

Plasticizer

The light-shielding paint of an embodiment of the present disclosure desirably may contain a plasticizer from the viewpoint of enhancing the flexibility of the resulting light-shielding film 1 so as not to easily crack. Examples of the plasticizer that can be used include dioctyl phthalate, diisononyl phthalate, diisodecyl phthalate, dibutyl phthalate, dioctyl adipate, diisononyl adipate, octyl trimellitate, polyester, tricresyl phosphate, acetyl tributyl citrate, sebacic acid esters, xylene resin, epoxidized soybean oil, epoxidized linseed oil, azelaic acid esters, maleic acid esters, and benzoic acid esters.

Other Additives

The light-shielding paint of an embodiment of the present disclosure may contain other additives within the range in which the features of the present disclosure are not lost. For example, a fungicide or an antioxidant may be added.

The content of such an additive in the light-shielding paint is desirably 5.0% by mass or less, such as 3.0% by mass or less.

Light-Shielding Paint Set

A light-shielding paint set of the present disclosure will now be described.

The light-shielding paint set is composed of three or more units including a first unit containing inorganic particles 12 having a refractive index (nd) of 2.2 or more, a second unit containing silica particles 13, and a third unit containing an amine-based curing agent. The above-described light-shielding paint is prepared by mixing all the units of the set. The compound 14 having an epoxy group is contained in any of the units except the third unit containing the amine-based curing agent and may be contained in either or both the first unit containing inorganic particles 12 having a refractive index (nd) of 2.2 or more and the second unit containing silica particles 13.

Since the inorganic particles 12 and the silica particles 13 are separately contained in different units of the first and the second unit, heteroaggregation of the inorganic particles 12 and the silica particles 13 can be prevented before mixing all the units. One or more units of the light-shielding paint set contain a coloring agent 15.

The light-shielding paint of an embodiment of the present disclosure may be prepared by mixing and dispersing the materials of all the units of the light-shielding paint set. For mixing and dispersing the materials, a mixer may be used, such as a ball mill, a bead mill, a collision disperser, a planetary mixer, a homogenizer, or a stirrer.

The viscosity of the light-shielding paint prepared by mixing all the units of the light-shielding paint set is desirably in the range of 20.0 mPa·s to 65 mPa·s, such as in the range of 30.0 mPa·s to 50 mPa·s. If the viscosity is reduced to less than 20.0 mPa·s, the coating property of the paint decreases and the unevenness of the resulting film is increased. If the viscosity is increased to more than 65 mPa·s, the inorganic particles 12 is hindered from moving, and accordingly, cannot be easily distributed locally to the vicinity of the interface. Consequently, internal reflection increases. Desirably, the mixture of the units is applied within 5 hours, otherwise the viscosity is increased by curing reaction and the concentration of the inorganic particles 12 at the interface is reduced by heteroaggregation that the inorganic particles 12 and the silica particles 13 are involved in.

Each of the materials contained in the light-shielding paint of the present disclosure may be contained in any of the units of the light-shielding paint set so that the mixture of all the units has the above-described composition of the light-shielding paint.

Light-Shielding Film

The light-shielding film according to an embodiment of the present disclosure will now be described.

The light-shielding film is formed by curing the coating of the light-shielding paint. The light-shielding film has the composition of the light-shielding paint from which the organic solvent is omitted. More specifically, the light-shielding film contains inorganic particles 12 having a refractive index (nd) of 2.2 or more, silica particles 13, an epoxy resin, a coloring agent, and an amine-based curing agent, and may optionally contain other materials described above.

In the light-shielding film, the average concentration of the inorganic particles 12 in an interface region having a thickness of 15 nm from the interface 7 between the substrate 2 and the light-shielding film 1 is 1.1 to 1.5 times as high as the average concentration of the inorganic particles 12 in the light-shielding film 1. If the average concentration of the inorganic particles 12 in the interface region is lower than 1.1 times that of the inorganic particles 12 in the light-shielding film 1, internal reflection increases. In contrast, if the average concentration of the inorganic particles 12 in the interface region is higher than 1.5 times that of the inorganic particles 12 in the light-shielding film 1, the adhesion of the light shielding film at the interface with the substrate 2 decreases, and accordingly the light-shielding film is easily separated from the interface.

The thickness of the light-shielding film may be in the range of 0.5 μm to 100 μm, such as in the range of 1 μm to 50 μm.

The contents of the constituents in the light-shielding film will now be described.

Compound Having Epoxy Group

The content of the epoxy resin or compound having an epoxy group in the light-shielding film is desirably in the range of 10.0% by mass to 40.0% by mass, such as 10.0% by mass to 30.0% by mass.

Inorganic Particles

The content of the inorganic particles having a refractive index (nd) of 2.2 or more in the light-shielding paint is desirably in the range of 5.0% by mass to 35.0% by mass, such as in the range of 10.0% by mass to 30.0% by mass. If the content of the inorganic particles is lower than 5% by mass, the refractive index of the light-shielding film is not increased much, and accordingly, internal reflection increases. In contrast, if the content of the inorganic particles is higher than 35.0% by mass, the elastic modulus of the light-shielding film increases, and accordingly, the light-shielding film becomes likely to crack.

Silica Particles

The silica particle content in the light-shielding paint is desirably in the range of 5.0% by mass to 30.0% by mass, such as in the range of 10.0% by mass to 30.0% by mass.

Coloring Agent

The coloring agent content in the light-shielding film is desirably in the range of 5.0% by mass to 40.0% by mass, such as in the range of 10.0% by mass to 30.0% by mass.

Amine-Based Curing Agent

The amine-based curing agent content in the light-shielding film is desirably in the range of 1.0% by mass to 30.0% by mass. If the amine-based curing agent content is lower than 1.0% by mass, the hardness of the light-shielding film decreases, and the adhesion of the light-shielding film to the substrate decreases. In contrast, if the amine-based curing agent content is higher than 30.0% by mass, satisfactory optical properties are not obtained.

Coupling Agent

The coupling agent content in the light-shielding film is desirably in the range of 10.0% by mass to 30.0% by mass, such as in the range of 15.0% by mass to 25.0% by mass.

Plasticizer

The plasticizer content in the light-shielding film is desirably in the range of 1.0% by mass to 20.0% by mass, such as in the range of 3.0% by mass to 10.0% by mass.

Other Additives

The content of other additives in the light-shielding film is desirably in the range of 0.1% by mass to 15.0% by mass, such as in the range of 0.1% by mass to 10.0% by mass.

Optical Element

The optical element of the present disclosure includes a substrate and the above-described light-shielding film formed on a part of the periphery of the substrate.

The substrate may be a glass substrate such as a lens or a prism. The refractive index of the glass substrate for a d-ray is desirably in the range of 1.60 to 2.00, such as in the range of 1.80 to 2.00.

The optical element of the present disclosure may be used as an element such as a lens, a prism, a reflecting mirror, or a diffraction grating, of an optical apparatus. For example, the optical element may be used in a camera, binoculars, a microscope, or a semiconductor exposure apparatus, and is provided with the light-shielding film outside the optically effective surface thereof.

Method for Manufacturing Optical Element

In the method for manufacturing an optical element according the present disclosure, an optical element having a light-shielding film on a part of the periphery of a substrate is manufactured. The method includes applying a light-shielding paint to form a coating, and curing the coating. The above-described light-shielding paint is used as the light-shielding paint in the method of the present disclosure. In the method of an embodiment, it may be desirable that the units of the above-described light-shielding paint set be mixed immediately before applying the light-shielding paint so that heteroaggregation of inorganic particles 12 and silica particles 13 can be prevented. In the method of the present disclosure, the materials and conditions for the above-described optical element can be used. The steps of the method will now be described.

Preparation of Light-Shielding Paint

The light-shielding paint may be prepared by mixing and dispersing the materials of the above-described light-shielding paint. For mixing and dispersing, a ball mill, a bead mill, a collision disperser, a planetary mixer, a homogenizer, or a stirrer may be used.

Desirably, the inorganic particles 12 are nanodispersed. For nanodispersion, a bead mill or a collision disperser may be used. Inorganic particles 12 of 2.2 or more in refractive index (nd) produced by a sol-gel method may be nanodispersed, or a commercially available nanodispersed product may be used.

Application of Light-Shielding Paint

In the step of applying the light-shielding paint, the light-shielding paint is applied onto a part of the surface of a glass substrate.

The application may be performed by dip coating, spin coating, slit coating, electrostatic coating, or using a tool such as a brush, a sponge or a bar coater, depending on the desired pattern of the coating.

Curing of Light-Shielding Paint

In the step of curing the light-shielding paint, the coating of the light-shielding paint is cured. For curing the coating of the light-shielding paint, the coating may be dried or baked. For promoting the curing reaction of the compound having an epoxy group with the curing agent, drying as described below is advantageous. If the curing is performed by drying, the coating is desirably dried at a temperature in the range of 20° C. to 100° C., more desirably in the range of 40° C. to 80° C., such as 40° C. to 60° C. The time for drying is desirably in the range of 10 minutes to 24 hours, more desirably in the range of 30 minutes to 24 hours, such as 1 hour to 24 hours. If the curing is performed by baking, it is desirably performed at a temperature in the range of 40° C. to 300° C., more desirably in the range of 40° C. to 250° C., such as 40° C. to 200° C. The time for baking is desirably in the range of 10 minutes to 10 hours, such as 10 minutes to 6 hours.

EXAMPLES

The present disclosure will be further described with reference to Examples and Comparative Examples.

The samples of the Examples and Comparative Examples were evaluated as bellow through the following examinations.

Measurement of Average Particle Sizes of Inorganic Particles in Light Shielding Paint The average particle sizes of the inorganic particles were measure with a dynamic light scattering apparatus Zeta sizer Nano MPT-2 (manufactured by Sysmex). Slurry diluted with propylene glycol monomethyl ether was placed in a cell, and the particle size of the sample was measured 20 times at a voltage of 5 mV, followed by averaging the measurements. The average particle size was defined as the peak value of the number distribution.

Measurement of Concentration of Inorganic Particles in Light-Shielding Film

The concentration of the inorganic particles 12 in the interface region of the light-shielding film at the interface between the substrate and the light-shielding film was measured by the following manner. The section of the light-shielding film of an optical element was sliced (to about several hundreds of nanometers) by focused ion beam (FIB), and the sample was observed through a scanning transmission electron microscope JEARM 200F (manufactured by JEOL). Elemental analysis was performed on the surface of the samples at an accelerating voltage of 200 kV by energy dispersive X-ray spectroscopy (EDX) using an elemental analyzer JED-2300T with a beam diameter of about 0.1 nm. Thus the concentration of the inorganic particles 12 in the interface region having a thickness of 15 nm of the light-shielding film was measured. The average concentration of the inorganic particles 12 in the entire light-shielding film was determined in the same manner.

Evaluation of Optical Properties

Measurement of Internal Reflectance

Figure 3:
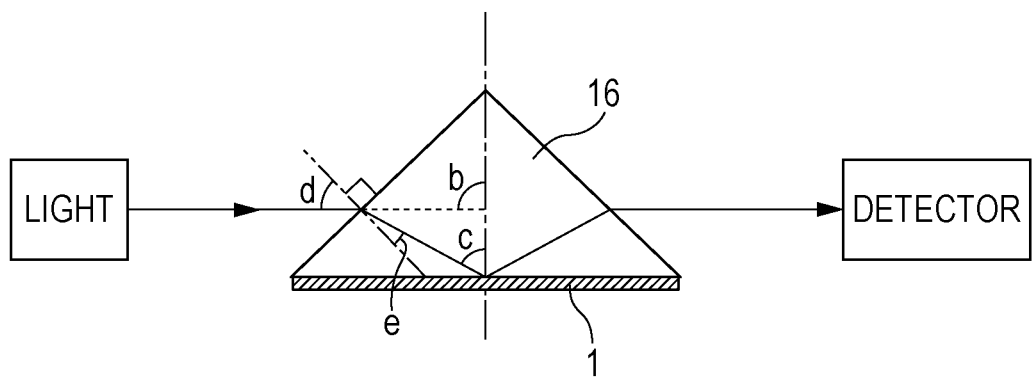
FIG. 3 is a schematic representation of a method for measuring internal reflection.
Figure 4:
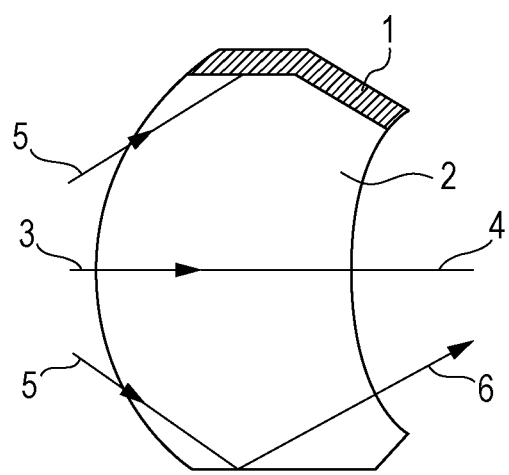
FIG. 4 is a schematic view of an optical element light-shielding film formed on a lens.

Internal reflectance was measured with a spectrophotometer U-4000 (manufactured by Hitachi High-Technologies), as shown in FIG. 3. A triangular prism was used for the measurement. Reference numeral 16 designates the prism. The triangular prims 16 is made of S-LaH53 (nd=1.8, manufactured by Ohara) and has edges of 30 mm in length that form a right angle therebetween, and a thickness of 10 mm.

FIG. 3 illustrates a measurement when light impinged onto the triangular prism 16 at an incident angle b of 90°. An exemplary measurement with the spectrophotometer will be described below with reference to FIG. 3. Light emitted from the spectrophotometer impinges onto the triangular prism 16 at an incident angle b of 90°. At this time, the light is refracted due to the difference in refractive index between the air and the triangular prism 16. The incident angle c on the light-shielding film of the refracted light was 68.13°. Angle e of the refracted light to incident angle d is calculated using the following equation (3). Also, incident angle c was calculated using angle e of refracted light.

$$nd = \sin d / \sin e \quad (3)$$

Subsequently, the refracted light in the triangular prism 16 impinges on the bottom of the prism 16 and is reflected, thereby going out of the triangular prism 16. The intensity of this reflected light was measured in a wavelength region of visible light of 400 nm to 700 nm. A triangular prism 16 having three mirror-finished surfaces of the bottom, the surface of incidence and the surface of reflection, not provided with any light-shielding film was used for measuring the background, and internal reflectance was measured for the samples having three mirror-finished surfaces of the bottom, the surface of incidence and the surface of reflection and provided with a light-shielding film on the bottom of the prism 16. Internal reflectances were measured for visible light having wavelengths in the range of 400 nm to 700 nm in increments of 1 nm, and the average of the results was shown.

Measurement of Viscosity at 20° C. of Light-Shielding Paint

The viscosity at 20° C. of each light-shielding paint was measured with a tuning fork vibration viscometer SV-1H (available from A&D Company).

Coating Property of Light-Shielding Paint

For evaluating the coating property of each optical element light-shielding paint, the light-shielding paint was applied to a flat glass MICRO SLIDGLASS S1126 (manufactured by Matsunami Glass Ind.), followed by drying. The amount of movement of the paint during drying was measured.

More specifically, a stack of three pieces of a Kapton tape each measuring 10 mm by 100 mm by 0.065 mm was bonded to both ends of the flat glass, measuring 30 mm by 100 mm by 1 mm, to form a sample having a step (height: 0.195 mm) between the flat glass and the Kapton tape stack.

The optical element light-shielding paint was uniformly applied onto a region of 10 mm by 100 mm by 0.196 mm of the resulting flat glass sample with Slidestar. After drying for 1 hour, the amount of movement of the paint was measured.

The coating property was rated according to the following criteria:

A: The coating property was as good as the amount of movement of 1 mm or less.

B: The coating property was not good such that the amount of movement was more than 1 mm and it was thus difficult to form a uniform light-shielding film.

Appearance of Light-Shielding Film

Optical element light-shielding films formed to a thickness of 10 μm on a flat glass made of S-LaH53 (nd=1.8, manufactured by Ohara) were rated according to the following criteria:

A: The light-shield film exhibit no cracks or no separation and a uniform color in visual observation.

B: The light-shield film exhibited any one of cracks, separation and nonuniform color.

Example 1

Preparation of Light-Shielding Paint

In Example 1, a light-shielding paint was prepared as below.

First, a first unit containing inorganic particles having a refractive index (nd) of 2.2 or more was prepared by mixing 40.0 g of titania dispersion liquid ND139 (product name, produced by Tayca Corp., PGME dispersion liquid with a titania content of 25% by mass), in which titania particles are dispersed as the inorganic particles 12 having a refractive index (nd) of 2.2 or more in a medium, 1.2 g of dye (1) VALIFAST-BLACK 3810 (product name, produced by Orient Chemical Industries), 3.0 g of dye (2) VALIFAST-RED 3320 (product name, produced by Orient Chemical Industries), 1.2 g of dye (3) VALIFAST-YELLOW 3108 (product name, produced by Orient Chemical Industries), 3.8 g of dye (4) VALIFAST-BLUE 2620 (product name, produced by Orient Chemical Industries), 3.0 g of xylene resin NIKANOL Y-50 (product name, produced by Fudow) as a plasticizer, and 0.5 g of fungicide Synthol M-100 (product name, produced by SC Environmental Science) in a dispersion container set in a roll coater by stirring at 66 rpm for 10 hours.

Subsequently, to a ball mill pot were added 7.0 g of an epoxy resin jER 828 (product name, produced by Mitsubishi Chemical), 3.2 g of hydrophobic silica (1) Aerosil R972 (product name, produced by Nippon Aerosil), 1.3 g of hydrophilic silica (2) Aerosil 200 (product name, produced by Nippon Aerosil), 9.5 g of a coupling agent KBM 403 (product name, produced by Shin-Etsu Chemical), and 21.0 g of an organic solvent propylene glycol monomethyl ether (produced by Kishida Chemical). Then, five magnetic balls of 20 mm in diameter were placed in the ball mill pot. The ball mill pot containing the materials added and the magnetic balls was set in a roll coater, and the content in the ball mill pot was stirred at 66 rpm for 72 hours. Thus a second unit containing silica particles was prepared. At this time, the secondary particle size of the silica particles was 210 nm.

Next, a third unit containing 0.2 g of a curing agent EH-6019 (product name, produced by ADEKA) was added to 10 g of the first unit containing inorganic particles having a refractive index (nd) of 2.2 or more and 8 g of the second unit containing silica particles, and the mixture of the three units was stirred for 3 minutes with a planetary mixer HM-500 (product name, produced by Keyence). Subsequently, the resulting light-shielding paint was applied to a thickness of 10 μm on a flat glass made of S-LaH53 (nd=1.8, manufactured by Ohara), followed by drying at room temperature for 60 minutes. Then, the dried coating was cured in a thermostatic oven at 140° C. for 2 hours to yield a light-shielding film of Example 1. The coating property of the light-shielding paint was rated according to the above-described criteria.

The composition of the light-shielding paint is shown in Table 1, and Table 3 shows the ratio of the inorganic particle concentration in the interface region to the inorganic particle concentration in the light-shielding film (concentration at interface/average concentration in film), the evaluation results of the coating property of the paint, the internal reflection, and appearance of the resulting light-shielding film.

Examples 2 to 8

Light-shielding paints of Examples 2 to 8 were prepared in the same manner as in Example 1 except for using the materials and conditions shown in Table 1, and Optical elements of Examples 2 to 8 were produced in the same manner as in Example 1 using the corresponding light-shielding paints. The evaluation results of the coating property of the paint and the internal reflection of the resulting light-shielding film are shown in Table 3.

In Examples 3 to 6, the control of the particle size of inorganic particles having a refractive index (nd) of 2.2 or more and the dispersion of the particles were performed as below. In a bead mill Ultra Apex Mill manufactured by Kotobuki Industries, 42.9 g of propylene glycol monomethyl ether, a dispersant, and 14.3 g of titanium oxide (CR-EL (product name, produced by Ishihara Sangyo)) were pulverized and dispersed in each other with beads of 50 μm in diameter. Thus a slurry was prepared which contained inorganic particles of 2.2 or more in refractive index (nd) having a desired number average particle size, and 40.0 g of each resulting slurry was used.

In Example 7, 1.2 g of jER Cure (R) H30 (product name, produced by Mitsubishi Chemical) was used as the curing agent in the third unit.

In Example 8, zirconia TECNAPOW-ZRO2-100 (product name, produced by TECNAN) was dispersed as the inorganic particles having a refractive index (nd) of 2.2 or more in the same manner as in Example 3.

TABLE 1

| | | | Example 1 | Example 2 | Example 3 | Example 4 | Example 5 | Example 6 | Example 7 | Example 8 |
|---|---|---|---|---|---|---|---|---|---|---|
| Light-shielding paint set | Unit containing inorganic particles of 2.2 or more in nd | Inorganic particles of 2.2 or more in nd | Material | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Zirconia (Dispersed in propylene glycol monomethyl ether, solid content: 25 wt %) |
| | | | Content (g) | 40 | 40 | 40 | 40 | 40 | 40 | 40 | 40 |
| | | | $d$ (nm) | | | | | | | | |
| | | Coloring agent | Material | 50 (1) Dye black (2) Dye red (3) Dye yellow (4) Dye blue | 50 (1) Dye black (2) Dye red (3) Dye yellow (4) Dye blue | 10 (1) Dye black (2) Dye red (3) Dye yellow (4) Dye blue | 20 (1) Dye black (2) Dye red (3) Dye yellow (4) Dye blue | 100 (1) Dye black (2) Dye red (3) Dye yellow (4) Dye blue | 10 (1) Dye black (2) Dye red (3) Dye yellow (4) Dye blue | 50 (1) Dye black (2) Dye red (3) Dye yellow (4) Dye blue | 15 (1) Dye black (2) Dye red (3) Dye yellow (4) Dye blue |
| | | | Content (g) | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 |
| | | Plasticizer | Material | Xylene resin | Xylene resin | Xylene resin | Xylene resin | Xylene resin | Xylene resin | Xylene resin | Xylene resin |
| | | | Content (g) | 3 | 3 | 3 | 3 | 3 | 3 | 3 | 3 |
| | | Other additives | Material | Fungicide | Fungicide | Fungicide | Fungicide | Fungicide | Fungicide | Fungicide | Fungicide |
| | | | Content (g) | 0.5 | 0.5 | 0.5 | 0.5 | 0.5 | 0.5 | 0.5 | 0.5 |
| | Unit containing silica particles | Silica particles | Material | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica |
| | | | Content (g) | (1) 3.2 (2) 1.3 | (1) 3.2 (2) 1.3 | (1) 3.2 (2) 1.3 | (1) 3.2 (2) 1.3 | (1) 3.2 (2) 1.3 | (1) 3.2 (2) 1.3 | (1) 3.2 (2) 1.3 | (1) 3.2 (2) 1.3 |
| | | | $d_{Si}$ (nm) | 210 | 150 | 50 | 350 | 350 | 340 | 210 | 210 |
| | | Resin | Material | Epoxy | Epoxy | Epoxy | Epoxy | Epoxy | Epoxy | Epoxy | Epoxy |
| | | | Content (g) | 7 | 7 | 7 | 7 | 7 | 7 | 7 | 7 |
| | | Coupling agent | Content (g) | 9.5 | 9.5 | 9.5 | 9.5 | 9.5 | 9.5 | 9.5 | 9.5 |
| | | Organic solvent | Material | Propylene glycol monobutyl ether | Propylene glycol monobutyl ether | Propylene glycol monobutyl ether | Propylene glycol monobutyl ether | Propylene glycol monobutyl ether | Propylene glycol monobutyl ether | Propylene glycol monobutyl ether | Propylene glycol monobutyl ether |
| | | | Content (g) | 21 | 21 | 21 | 21 | 21 | 21 | 21 | 21 |
| | Unit containing amine-based curing agent | | Material | Amine-based | Amine-based | Amine-based | Amine-based | Amine-based | Amine-based | Amine-based | Amine-based |
| | | | Content (g) | 0.2 | 0.2 | 0.2 | 0.2 | 0.2 | 0.2 | 1.2 | 1.2 |
| Light-shielding paint | | | $d_{Si} - d_p$ (nm) | 160 | 100 | 40 | 330 | 250 | 330 | 170 | 160 |
| | | | Viscosity (mPa·s) | 32 | 20 | 40 | 56 | 65 | 60 | 34 | 33 |

Comparative Examples 1 to 7

Light-shielding paints of Comparative Examples 1 to 7 were prepared in the same manner as in Example 1 except for using the materials and conditions shown in Table 2, and optical elements of Comparative Examples 1 to 7 were produced in the same manner as in Example 1 using the corresponding light-shielding paints. The evaluation results of the coating property of the paint and the internal reflection of the resulting light-shielding film are shown in Table 3.

In Comparative Examples 1 to 7, the control of the particle size of inorganic particles having a refractive index (nd) of 2.2 or more and the dispersion of the particles were performed as below. In a bead mill Ultra Apex Mill manufactured by Kotobuki Industries, 42.9 g of propylene glycol monomethyl ether, a dispersant, and 14.3 g of titanium oxide MT-05 (product name, produced by Tayca Corp.) were dispersed in each other with beads of 50 μm in diameter. Thus inorganic particles of 2.2 or more in refractive index (nd) having a number average particle size of the corresponding Comparative Example were prepared.

TABLE 2

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Light-shielding paint set | Unit containing inorganic particles of 2.2 or more in nd | Inorganic particles of 2.2 or more in nd | Material | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) | Titania (Dispersed in propylene glycol monomethyl ether, solid content: 25 wt %) |
| | | | Content (g) | 40 | 40 | 40 | 40 | 40 | 40 | 40 |
| | | | Particle size (nm) | 5 | 110 | 50 | 50 | 10 | 50 | 10 |
| | | Coloring agent | Material | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue |
| | | | Content (g) | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 |
| | | Plasticizer | Material | Xylene resin | Xylene resin | Xylene resin | Xylene resin | Xylene resin | Xylene resin | Xylene resin |
| | | | Content (g) | 3 | 3 | 3 | 3 | 3 | 3 | 3 |
| | | Other additives | Material | Fungicide | Fungicide | Fungicide | Fungicide | Fungicide | Fungicide | Fungicide |
| | | | Content (g) | 0.5 | 0.5 | 0.5 | 0.5 | 0.5 | 0.5 | 0.5 |
| | Unit containing silica particles | Silica particles | Material | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica |
| | | | Content (g) | (1) 3.2 (2) 1.3 | (1) 3.2 (2) 1.3 | (1) 3.2 (2) 1.3 | (1) 3.2 (2) 1.3 | (1) 3.2 (2) 1.3 | (1) 3.2 (2) 1.3 | (1) 3.2 (2) 1.3 |
| | | | Particle size (nm) | 210 | 210 | 40 | 370 | 210 | 80 | 340 |
| | | Resin | Material | Epoxy | Epoxy | Epoxy | Epoxy | Epoxy | Epoxy | Epoxy |
| | | | Content (g) | 7 | 7 | 7 | 7 | 7 | 7 | 7 |
| | | Coupling agent | Content (g) | 9.5 | 9.5 | 9.5 | 9.5 | 9.5 | 9.5 | 9.5 |
| | | Organic solvent | Material | Propylene glycol monomethyl ether | Propylene glycol monomethyl ether | Propylene glycol monomethyl ether | Propylene glycol monomethyl ether | Propylene glycol monomethyl ether | Propylene glycol monomethyl ether | Propylene glycol monomethyl ether |
| | | | Content (g) | 21 | 21 | 21 | 21 | 21 | 21 | 42 |
| | Unit containing amine-based curing agent | | Material | Amine-based | Amine-based | Amine-based | Amine-based | Amine-based | Amine-based | Amine-based |
| | | | Content (g) | 0.2 | 0.2 | 0.2 | 0.2 | 0.2 | 0.2 | 0.2 |
| Light-shielding paint | | | $d_{Si} - d_p$ (nm) | 205 | 100 | −10 | 320 | 340 | 30 | 330 |
| | | | Viscosity (mPa·s) | 80 | 38 | 18 | 70 | 62 | 22 | 15 |

TABLE 3

| | Inorganic particle concentration (Concentration at interface/average concentration in film) | Internal reflectance | Coating property rating | Amount of movement (mm) | Appearance |
|---|---|---|---|---|---|
| Example 1 | 1.3 | 12% | A | 0.78 | A |
| Example 2 | 1.4 | 10% | A | 0.98 | A |
| Example 3 | 1.4 | 11% | A | 0.63 | A |
| Example 4 | 1.5 | 13% | A | 0.45 | A |
| Example 5 | 1.1 | 15% | A | 0.38 | A |
| Example 6 | 1.3 | 13% | A | 0.46 | A |
| Example 7 | 1.3 | 12% | A | 0.8 | A |
| Example 8 | 1.2 | 14% | A | 0.8 | A |
| Comparative Example 1 | 1 | 16% | A | 0.2 | A |
| Comparative Example 2 | 1 | 18% | A | 0.66 | A |
| Comparative Example 3 | 1 | 16% | B | 2.2 | A |
| Comparative Example 4 | 1 | 20% | A | 0.4 | A |
| Comparative Example 5 | 1 | 20% | A | 0.38 | A |
| Comparative Example 6 | 1 | 18% | A | 0.9 | A |
| Comparative Example 7 | 1.6 | — (Separated) | B | 2.5 | B |

Evaluation Results

In Examples 1 to 7, the average concentration of the inorganic particles of 2.2 or more in refractive index (nd) in the interface region of the light-shielding film was 1.1 to 1.5 times as large as the average concentration of the inorganic particles in the light-shielding film, and the internal reflectance was as low as 15% or less, suggesting a good coating property.

On the other hand, Comparative Examples 1 to 6, in which the average concentration of the inorganic particles of 2.2 or more in refractive index (nd) in the interface region of the light-shielding film was less than 1.1 times, exhibited higher internal reflectances than Examples. Also, in Comparative Example 7, in which the average concentration of the inorganic particles in the interface region of the light-shielding film was more than 1.5 times as large as the average concentration of the inorganic particles in the light-shielding film, the light-shielding film was separated at the interface with the glass substrate and thus exhibited poor appearance, and the internal reflectance was not able to be measured. Furthermore, in Comparative Examples 3 and 7, the light-shielding paint was moved 1 mm or more after being applied. Thus, the coating was not formed within a desired region.

The optical element of an embodiment of the present disclosure can be used in optical apparatuses, such as cameras, binoculars, microscopes, and semiconductor exposure apparatuses.

The present disclosure provides an optical element, a light-shielding paint and a light-shielding paint set that have good optical properties and can suppress flaring and ghosts, and a method for manufacturing the optical element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-021500, filed Feb. 5, 2015, which is hereby incorporated by reference herein in its entirety.

What is claimed is:

1. An optical element comprising:
a substrate; and
a light-shielding film on a part of the periphery of the substrate, the light-shielding film containing an epoxy resin, a coloring agent, inorganic particles having a refractive index of 2.2 or more, and silica particles, the light-shielding film having an interface region having a thickness of 15 nm from the interface between the substrate and the light-shielding film,
wherein the average concentration of the inorganic particles in the interface region is 1.1 to 1.5 times as high as the average concentration of the inorganic particles in the light-shielding film.

2. The optical element according to claim 1, wherein the substrate is one of a lens and a prism.

3. The optical element according to claim 1, wherein the light-shielding film has a thickness in the range of 0.5 µm to 100 µm.

4. The optical element according to claim 1, wherein the content of the inorganic particles in the light-shielding film is in the range of 5.0% by mass to 35.0% by mass.

5. The optical element according to claim 1, wherein the inorganic particles having a refractive index of 2.2 or more are titania particles.

6. The optical element according to claim 1, wherein the content of the silica particles in the light-shielding film is in the range of 5.0% by mass to 30.0% by mass.

7. The optical element according to claim 1, wherein the light-shielding film is formed by curing a light-shielding paint containing a compound having an epoxy group, a coloring agent, inorganic particles having a refractive index of 2.2 or more, silica particles, and an amine-based curing agent, and wherein the inorganic particles have a number average particle size $d_p$ in the range of 10 nm to 100 nm, the silica particles have a number average particle size $d_{si}$ in the range of 50 nm to 350 nm, and the inorganic particles and the silica particles satisfy the following relationship: 40 nm $\leq (d_{si}-d_p) \leq$ 330 nm.

8. The optical element according to claim 7, wherein the content of the inorganic particles in the light-shielding film is in the range of 5.0% by mass to 35.0% by mass, and the content of the silica particles in the light-shielding film is in the range of 5.0% by mass to 30.0% by mass.

9. A light-shielding paint set comprising:
a first unit containing inorganic particles having a refractive index of 2.2 or more;
a second unit containing silica particles; and
a third unit containing an amine-based curing agent,
wherein any of the first, the second and the third unit contains a compound having an epoxy group, and wherein the inorganic particles have a number average particle size $d_p$ in the range of 10 nm to 100 nm, the silica particles have a number average particle size $d_{si}$ in the range of 50 nm to 350 nm, and the inorganic particles and the silica particles satisfy the following relationship:

40 nm $(d_{si}-d_p)$ 330 nm.

10. A method for manufacturing an optical element including a substrate and a light-shielding film on a part of the periphery of the substrate, the method comprising:
applying a light-shielding paint onto the periphery of the substrate to form a coating, the light-shielding paint being prepared by mixing the first, the second and the third unit as set forth in claim 9; and
curing the coating to form the light-shielding film.

11. The method according to claim 10, wherein the light-shielding film has an interface region having a thickness of 15 nm from the interface between the substrate and the light-shielding film, and the average concentration of the inorganic particles in the interface region is 1.1 to 1.5 times as high as the average concentration of the inorganic particles in the light-shielding film.

12. The method according to claim 10, wherein the optical element is one of a lens and a prism.

13. The method according to claim 12, wherein the inorganic particles having a refractive index of 2.2 or more are titania particles.

14. The method according to claim 13, wherein the content of the inorganic particles in the light-shielding paint is in the range of 2.5% by mass to 17.5% by mass.

15. The method according to claim 14, wherein the content of the silica particles in the light-shielding paint is in the range of 2.5% by mass to 15.0% by mass.

16. An optical element comprising:
a substrate made of glass; and
a light-shielding film on a part of the substrate, the light-shielding film containing an epoxy resin, silica particles, and inorganic particles having a refractive index of 2.2 or more,
wherein the average concentration of the inorganic particles in a part of the light-shielding film, the part having a thickness of 15 nm from the interface between the substrate and the light-shielding film is 1.1 to 1.5 times as high as the average concentration of the inorganic particles in the light-shielding film.

17. The optical element according to claim 16, wherein the inorganic particles are titania particles.

18. The optical element according to claim 17, wherein the light-shielding film further contains a coloring agent.

19. The optical element according to claim 18, wherein the substrate is one of a lens and a prism.

20. The optical element according to claim 19, wherein the light-shielding film has a thickness in the range of 0.5 μm to 100 μm.

21. The optical element according to claim 18, wherein the titania particles have a number average particle size $d_p$ in the range of 10 μm to 100 nm.

22. The optical element according to claim 21, wherein the content of the titania particles in the light-shielding film is in the range of 5.0% by mass to 35.0% by mass.

23. The optical element according to claim 22, wherein the content of the silica particles in the light-shielding film is in the range of 5.0% by mass to 30.0% by mass.

24. The optical element according to claim 17, wherein the light-shielding film is formed by curing a light-shielding paint containing a compound having an epoxy group, titania particles, and silica particles.

25. The optical element according to claim 23, wherein the silica particles have a number average particle size $d_{Si}$ in the range of 50 nm to 350 nm.

26. The optical element according to claim 25, wherein a number average particle size $d_p$ of the titania particles and a number average particle size $d_{Si}$ of the silica particles satisfy the following relationship:

$$40 \text{ nm} \leq (d_{Si} - d_p) \leq 330 \text{ nm}.$$

27. The optical element according to claim 20,
wherein the titania particles have a number average particle size $d_p$ in the range of 10 nm to 100 nm,
wherein the silica particles have a number average particle size $d_{Si}$ in the range of 50 nm to 350 nm, and
wherein a number average particle size $d_p$ of the titania particles and a number average particle size $d_{Si}$ of the silica particles satisfy the following relationship:

$$40 \text{ nm} \leq (d_{Si} - d_p) \leq 330 \text{ nm}.$$

28. The optical element according to claim 27, wherein the content of the titania particles in the light-shielding film is in the range of 5.0% by mass to 35.0% by mass, and the content of the silica particles in the light-shielding film is in the range of 5.0% by mass to 30.0% by mass.

29. An optical apparatus, comprising:
the optical element according to claim 18.

30. A method for manufacturing an optical element including a substrate and a light-shielding film, the method comprising:
mixing a first unit containing inorganic particles having a refractive index of 2.2 or more, a second unit containing silica particles and a third unit containing an amine-based curing agent to obtain a light-shielding paint;
applying the light-shielding paint onto the periphery of the substrate to form a coating; and
curing the coating to form the light-shielding film.

31. The method according to claim 30,
wherein any of the first, the second and the third unit contains a compound having an epoxy group.

32. The method according to claim 31,
wherein the inorganic particles have a number average particle size $d_p$ in the range of 10 nm to 100 nm, the silica particles have a number average particle size $d_{Si}$ in the range of 50 nm to 350 nm, and the inorganic particles and the silica particles satisfy the following relationship:

$$40 \text{ nm} \leq (d_{Si} - d_p) \leq 330 \text{ nm}.$$

33. The method according to claim 31, wherein the optical element is one of a lens and a prism.

34. The method according to claim 30, wherein the inorganic particles are titania particles.

35. The method according to claim 30, wherein the applying is performed within 5 hours after the mixing.

36. The method according to claim 34, wherein the applying is performed within 5 hours after the mixing.

37. The method according to claim 36, wherein the content of the titania particles in the light-shielding paint is in the range of 2.5% by mass to 17.5% by mass.

38. The method according to claim 37, wherein the content of the silica particles in the light-shielding paint is in the range of 2.5% by mass to 15.0% by mass.

\* \* \* \* \*